May 18, 1965  F. J. FISHER  3,183,714
PROTECTIVE HOUSING FOR METER EQUIPMENT
Filed March 16, 1962
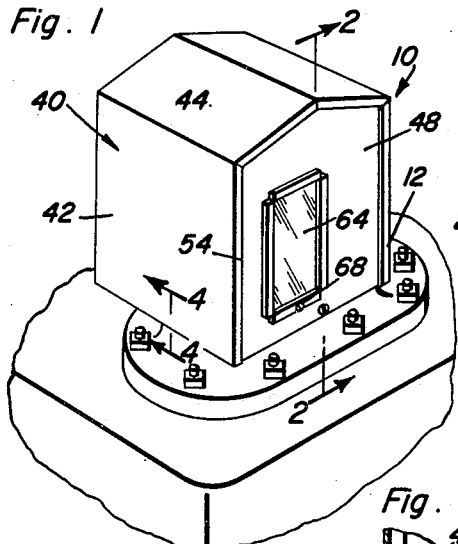
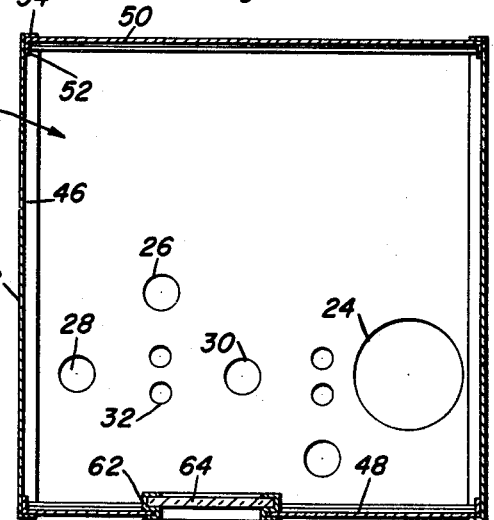
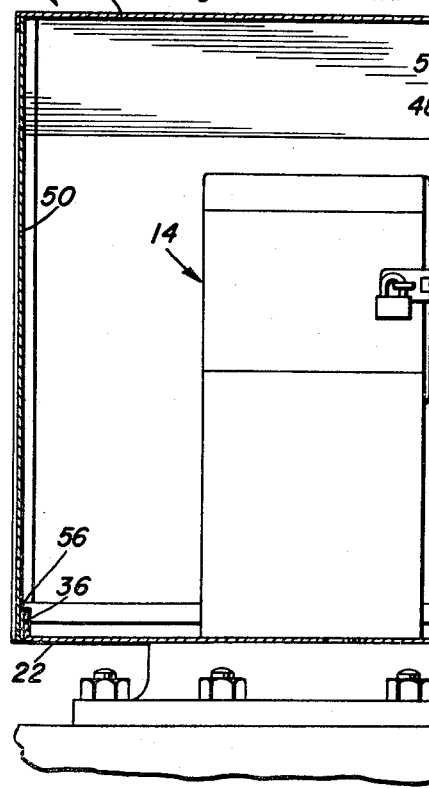
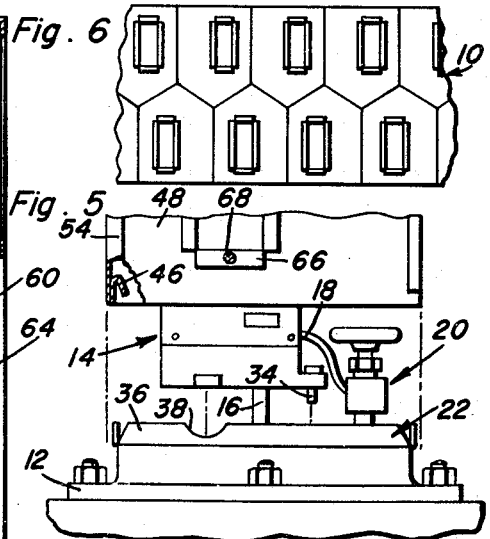
Frank J. Fisher
INVENTOR.
BY Clarence A. O'Brien
and Harvey B. Jacobson
Attorneys

United States Patent Office 3,183,714
Patented May 18, 1965

3,183,714
PROTECTIVE HOUSING FOR METER EQUIPMENT
Frank J. Fisher, 412 Evans St., Evansville, Wyo.
Filed Mar. 16, 1962, Ser. No. 180,246
8 Claims. (Cl. 73—273)

This invention relates to a protective enclosure assembly for a meter reading device of the type that measures pressure and flow volume of fluids such as natural gas.

The protective housing enclosure of the present invention is particularly concerned with installations wherein large volumes of gas are used such as at schools, commercial buildings, oil fields, or where a tap is attached to a high pressure gas transmission line. Many times, these installations are located in areas subject to the effects of weather, dirt, dust and damage by cattle and other causes. Thus, the protection afforded by the housing assembly of the present invention prevents impairment of complicated and expensive meter equipment by foreign matter and other such causes, where such meter equipment is left unattended and exposed.

In accordance with the foregoing objects, the protective housing assembly of the present invention includes a flat base loosely installed above a meter mounting base or meter head after removal of the meter recording device and disconnecting the meter line to the high pressure valve after closing of the valve. The meter recording device is then reinstalled above the mounting base securing the flat housing base thereto. The remaining portion of the protective housing is then guidingly received by the flat base portion in surrounding relation to the recording device above the meter head and secured thereto by a pair of fasteners to complete an adequately sealed enclosure for the meter recording device and valve assembly associated therewith. The resulting enclosure is not only weatherproof and sufficiently protective for the intended purposes, but may be installed very rapidly without disassembly of the meter itself or enclosure of the flow conduits connected to the meter and may be manufactured in an economical fashion making wider distribution of the protective housing more economically feasible. Furthermore, the housing assembly so constructed is flexible as to installational location and meter equipment configuration.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of a protective meter housing in installed position.

FIGURE 2 is a sectional view taken substantially through a plane indicated by section line 2—2 in FIGURE 1.

FIGURE 3 is a sectional view in a horizontal plane through the protective housing assembly with the meter and valve assembly removed.

FIGURE 4 is a partial sectional view taken substantially through a plane indicated by section line 4—4 in FIGURE 1.

FIGURE 5 is a partial front elevational view showing the housing and meter in partially disassembled positions.

FIGURE 6 is a diagrammatic view illustrating the storage stacking arrangement of a plurality of protective housing assemblies.

Referring now to the drawings in detail, it will be observed from FIGURE 1, that the protective housing assembly generally referred to by reference numeral 10 is adapted to be installed above a meter usually having a mounting base or head 12 and to which connections to a fluid transmission line (not shown) may be made. Accordingly, as more clearly seen in FIGURES 2 and 5, the housing assembly 10 is disposed in enclosing relation to a meter recording or reading device 14 operated by a meter shaft 16 which projects from the meter above the meter mounting head 12, the meter reading device 14 being operatively connected by a line 18 to a valve assembly 20 by means of which the meter may be operatively disconnected from the recording device 14.

The housing assembly 10 includes a separated flat base portion generally referred to by reference numeral 22. As more clearly seen in FIGURES 3 and 5, the base portion 22 is slidably and loosely mounted on top of the meter mounting head 12 without being secured thereto. Accordingly, the base portion 22 includes a plurality of apertures for accommodating different types of installation and meter reading devices. The apertures include therefore, base aligning apertures or openings 24, 26 and 28 through which valve assemblies may be received, the illustrated example showing the valve assembly 20 being received through the opening 24. Also, a base aligning aperture 30 is provided for receiving therethrough the meter shaft 16. The flat base portion 22 also includes a plurality of mounting apertures 32 through which fastener elements 34 may extend, these fasteners usually securing the device 14 directly to the mounting head 12 but in the case of the present invention, also clamps the flat base portion 22 above the head. Peripherally formed about the flat base portion 22, are upturned guiding edge portions 36 one of which edge portions 36 may have an aligning notch 38 formed therein to assist the installer in aligning the device 14 with the meter shaft 16 for driving connection to the meter. The guiding edge portions 36 are therefore adapted to guidingly receive the remainder of the housing assembly 10 in proper position surrounding the device 14 and valve assembly 20.

The housing assembly therefor includes a foldable panel assembly generally referred to by reference numeral 40. The foldable panel assembly includes side panel portions 42 and roof panel portions 44. The side panel portions 42 have formed along the bottom edges thereof, folded tab portions 46 which are adapted to be received upon the guide edge portions 36 of the base 22 as more clearly seen in FIGURES 4 and 5. The folded assembly 40 is thereby adapted to be properly seated upon the base portion in enclosing relation to the device 14 and valve assembly 20. The folded assembly 40 is however maintained in a rigid condition by connection thereto of spaced panel members 48 and 50.

The spaced panel members 48 and 50 are provided along the side and top edges thereof, with foldable tab portions 52 which abut against and are secured to the panel portions of the folded panel assembly 40. The folded panel assembly 40 is therefore also provided with folded tab portions 54 to form a seam. Accordingly, the folded panel assembly 40 forms with the spaced panel members 48 and 50 a rigid enclosing assembly having an open bottom which is closed by the flat base portion 22. Accordingly, the panel members 48 and 50 have secured to the bottom thereof folded portions 50 constituting a sealing abutment that contacts the upturned guide edge portions 36 of the base portion 22. Two fasteners 58 are therefore utilized to complete the enclosure assembly, said fasteners respectively securing the bottom edge portions of the spaced panel members 48 and 50 to the upturned guide edge portions 36 of the base portion 22. A perfectly sealed weatherproof enclosure is thereby formed. However, it will be apparent that viewing of the device 14 through the enclosure will be necessary for which reason an opening 60 is formed in the panel member 48 in alignment with the meter shaft 16.

Peripherally mounted along three edges of the opening 60 in the panel member 48, are track members 62 adapted to receive therebetween a transparent closure member or window 64. An adjustable window-retaining member 66 is mounted along the bottom edge of the opening 60 to complete assembly of the window within the opening 60. Accordingly, a fastener 68 is provided for securing the member 66 in adjusted position on the panel member 48.

From the foregoing description, the utility and advantages of the protective enclosure housing assembly will be apparent. It will therefore be appreciated, that the housing assembly of the present invention is arranged to be aligned in accordance with any meter equipment installation and secured in place by the fasteners associated with the meter itself. Installation is effected in a most efficient manner by installation of the base portion of the housing enclosure between the device 14 and the mounting head 12 of the meter installed in the fluid transmission line so that the remainder of the housing enclosure may be guidingly received above the meter on the base portion. Assemblage and removal of the housing enclosure on the base portion is thereafter accomplished quickly and accurately and secured by two fasteners 58 to form a complete weatherproof enclosure. Viewing of the meter scale on the recorder device 14 is then made possible through a window 64 the area of which is restricted to the meter scale. It will also be apparent that the apex roof formation formed by the panel portions 44 of the folded assembly 40, enables the housing assemblies to be efficiently stacked for storage purposes as indicated in FIGURE 6. Also, the plurality of apertures formed in the flat base portion of the housing assembly as illustrated in FIGURE 3 for example, enable the housing assembly to be installed in a wide variety of installations.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalent may be resorted to, falling within the scope of the invention as claimed.

What is claimed as new is as follows:

1. A protective housing assembly for a meter reading device adapted to be mounted on a meter from which a meter shaft projects and on which meter the reading device is mounted by fasteners adjacent to a valve assembly, comprising, base means having aligning apertures therein for loosely receiving said meter shaft and valve assembly therethrough and mounting apertures through which said fasteners extend to secure said meter reading device to the meter above the base means, a folded panel assembly, said base means including peripheral guide means for guidingly receiving said folded panel assembly in enclosing relation to the meter reading device and said valve assembly, spaced panels connected to said folded panel assembly to form a rigid enclosure therewith, said spaced panels and the folded panel assembly having bottom edges forming an open bottom of the enclosure and folded sealing means formed on said bottom edges of said spaced panels for abutment with and fastening to said guide means to close the open bottom of the enclosure by the base means.

2. The combination of claim 1, wherein one of said spaced panels has an opening therein in alignment with said meter reading device, sealing track means mounted on said panel in peripheral relation to said opening and transparent closure means mounted in said track means through which said meter reading device may be read.

3. The combination of claim 2, wherein said guide means comprises upturned edge portions on said base means and folded tabs are formed on the bottom edges of said folded panel assembly to receive said edge portions.

4. The combination of claim 3, wherein said folded panel assembly includes an apex roof portion to facilitate stacking and water drainage.

5. The combination of claim 1, wherein said guide means comprises upturned edge portions on said base means and folded tabs are formed on the bottom edges of said folded panel to receive said edge portions.

6. The combination of claim 5, wherein said folded panel assembly includes an apex roof portion to facilitate stacking and water drainage.

7. In combination with a fluid flow meter and a recording device operatively connected to said flow meter and mounted thereabove by fasteners, a protective housing assembly for the recording device comprising a base clamped between said flow meter and the recording device by said fasteners, an enclosure having a viewing window through which the recording device may be read, and means on the base for removably receiving the enclosure in surrounding relation to the recording device spaced above the flow meter.

8. In combination with a flow meter having a meter shaft and a mounting head through which the meter shaft extends upwardly, a meter reading device driven by said meter shaft, fastener means securing the reading device to the mounting head above the flow meter and a protective housing comprising, a base portion clamped between said mounting head and the reading device having openings through which the meter shaft and the fastener means extend, an enclosure, and means for guidingly receiving the enclosure on the base portion in surrounding relation to the reading device.

References Cited by the Examiner
UNITED STATES PATENTS

| | | |
|---|---|---|
| 578,775 | 3/97 | Ringness _____ 73—201 X |
| 1,481,415 | 1/24 | Casper. |
| 1,715,538 | 6/29 | Dean et al. |
| 2,690,077 | 9/54 | Lisenbee _____ 73—201 |

RICHARD C. QUEISSER, *Primary Examiner.*

ROBERT L. EVANS, *Examiner.*